United States Patent
Hiramatsu et al.

(10) Patent No.: US 6,539,234 B1
(45) Date of Patent: Mar. 25, 2003

(54) RADIO COMMUNICATION TERMINAL AND TRANSMISSION POWER CONTROL METHOD

(75) Inventors: Katsuhiko Hiramatsu, Yokosuka (JP); Kazuyuki Miya, Kawasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/529,912

(22) PCT Filed: Aug. 20, 1999

(86) PCT No.: PCT/JP99/04467

§ 371 (c)(1),
(2), (4) Date: Apr. 21, 2000

(87) PCT Pub. No.: WO00/13342

PCT Pub. Date: Mar. 9, 2000

(30) Foreign Application Priority Data

Aug. 28, 1998 (JP) ............................................. 10-243744

(51) Int. Cl.⁷ ............................... H04B 1/38; H04M 1/00
(52) U.S. Cl. ......................... 455/522; 455/562; 370/318
(58) Field of Search ................................ 455/69, 277.1, 455/422, 522, 562; 370/318

(56) References Cited

U.S. PATENT DOCUMENTS

| | | | | |
|---|---|---|---|---|
| 5,129,098 A | * | 7/1992 | McGirr et al. ................. | 455/69 |
| 5,898,740 A | * | 4/1999 | Laakso et al. ............... | 375/346 |
| 6,304,749 B1 | * | 10/2001 | Obara ........................ | 455/126 |
| 6,317,587 B1 | * | 11/2001 | Tiedemann, Jr. et al. ..... | 455/69 |
| 6,330,455 B1 | * | 12/2001 | Ichihara ...................... | 455/522 |

FOREIGN PATENT DOCUMENTS

| | | | | |
|---|---|---|---|---|
| EP | 0823793 | 2/1998 | | |
| JP | 7-87011 | 3/1995 | | |
| JP | 10-51380 | 2/1998 | | |
| JP | 10-56421 | 2/1998 | | |
| JP | 10-051380 | * | 2/1998 | ............ H04B/7/26 |

* cited by examiner

*Primary Examiner*—Daniel Hunter
*Assistant Examiner*—James Ewart
(74) *Attorney, Agent, or Firm*—Stevens, Davis, Miller & Mosher, LLP

(57) ABSTRACT

A first reception power measuring section 206 measures reception power of individual channel signals transmitted with a narrow directivity, and a second reception power measuring section 207 measures reception power of common channel signals transmitted with a wide directivity. A determining section 210 determines the presence or absence of a directional shift based on an average reception power of the individual channel signals and an average reception power of the common channel signals. A transmission power controlling means 211 performs transmission power control based on the determination result. This makes it possible to correctly determine the cause of a reduction in reception power and to control transmission power accurately.

15 Claims, 6 Drawing Sheets

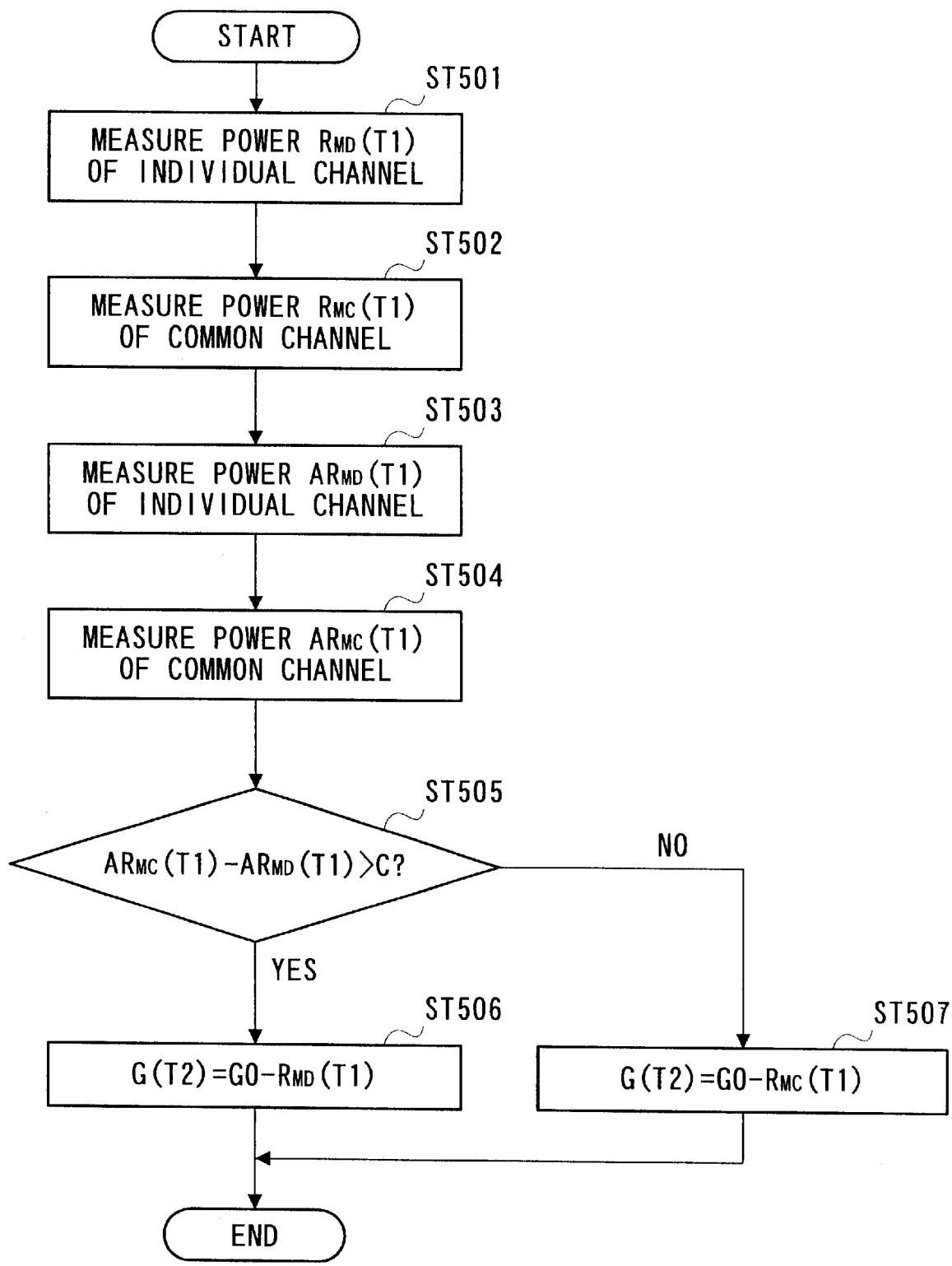
F I G. 6

RADIO COMMUNICATION TERMINAL AND TRANSMISSION POWER CONTROL METHOD

This application is a 371 of PCT/JP99/04467 filed Aug. 20, 1999.

TECHNICAL FIELD

The present invention relates to a radio communication terminal apparatus for use in a radio communication system such as a cellular phone, a car phone, etc., and relates to a transmission power control method.

BACKGROUND ART

In order to perform favorable communications in a radio communication system such as a cellular phone, a car phone, etc., which have proliferated in recent years, precise control of transmission power is an absolute necessity for a base station apparatus and a radio communication terminal apparatus (hereinafter simply referred to as "terminal apparatus").

The following will explain the action of a conventional terminal apparatus with reference to the drawing. FIG. 1 is a block diagram showing a configuration of the conventional terminal apparatus.

A signal received by an antenna 11 is input to a reception RF section 13 via a duplexer 12, power of the received signal is amplified, and the frequency of the received signal is converted, and a baseband signal is extracted. This baseband signal is demodulated by a demodulating section 14, and an individual channel signal of the terminal apparatus is picked up.

Also, reception power of the individual channel of the terminal apparatus output from the demodulating section 14 is measured by a reception power measuring section 15, and a gain of a transmission amplifier is calculated by a transmission power control section 15 based on the reception power.

A transmission signal is modulated by a modulating section 17, and the frequency thereof is converted by a transmission RF section 18, and power thereof is amplified based on the gain of the transmission amplifier, and the resultant is transmitted from the antenna 11 via the duplexer 12.

Here, it is required that the communication apparatus controls transmission power in consideration an amount of attenuation such that the radio transmitted signal is attenuated at a propagation path. The terminal apparatus controls transmission power such that reception power becomes constant in the base station apparatus.

At time t1, it is assumed that the gain of the transmission amplifier of the base station apparatus is set to GB(t1) and that an amount of attenuation of a forward link is set to LD(t1). Reception power RM(t1) of the individual channel received by the terminal apparatus can be calculated by equation (1) shown below.

Also, at time t2, it is assumed that the gain of the transmission amplifier of the terminal apparatus is set to GM(t2) and that an amount of attenuation of a reverse link is set to LU(t2). Reception power RB(t2) of the base station apparatus can be calculated by equation (2) shown below. In this case, the respective power values explained below are unified by an expression dB and calculated by addition and subtraction since they treat the gain.

$$RM(t1)=GB(t1)-LD(t1) \quad (1)$$

$$RB(t2)=GM(t2)-LU(t2) \quad (2)$$

Here, in a TDD (Time Division Duplex) communication system, since the same frequency is used in the reverse link and the forward link, if a time distance between a reception slot and a transmission slot is short, the propagation paths of these slots can be regarded as the same. Then, the amount of attenuation LD(t1) of the forward link at time t1 and that of attenuation LU(t2) of the reverse link at time t2 can be treated as the same.

Therefore, the gain GM(t2) of the transmission amplifier of the terminal apparatus results in a value, which is obtained by adding the amount of attenuation LD(t1) of the forward link to the reception power RB(t2) of the base station apparatus, which is a predicted target gain, and this can be expressed by equation (3) shown below.

$$GM(t2)=RB(t2)+LD(t1) \quad (3)$$

Here, in a case where the gain GM(t1) of the transmission amplifier of the base station apparatus is constant and the predictive reception power RB(t2) of the base station apparatus is constantly controlled, it is assumed that these added values are set to a fixed gain G0. In this case, GM(t2) of the transmission amplifier of the terminal apparatus can be calculated from equations (1) and (3) by equation (4) shown below.

$$GM(t2)=G0-RM(t1) \quad (4)$$

Thus, the conventional terminal apparatus controls the gain GM(t2) of the transmission amplifier such that the reception power RB(t2) of the base station apparatus becomes constant on the basis of the measured reception power RM(t1).

Here, in a case where the base station apparatus transmits the signal with a narrow directivity, the reception power is lowered by the directional shift with respect to the terminal apparatus in addition to the attenuation of reception power at the propagation path.

In this case, even if the received signal is lowered by the directional shift, the aforementioned conventional terminal apparatus determines as attenuation at the propagation path and transmits the signal with an excessive power, and this causes problems wherein an amount of interference to the other peripheral terminal apparatuses increases to make it impossible to perform communications with the other peripheral terminal apparatuses and a battery lifetime shortens.

DISCLOSURE OF INVENTION

It is an object of the present invention is to provide a terminal apparatus, which can correctly determine the cause of a reduction in reception power and control transmission power precisely, and to provide a transmission power control method.

The above object can be attained by calculating a transmission gain from reception power of individual channels, determining the presence or absence of a directional shift from a ratio between an average reception power of individual channels and an average reception power of common channels, and calculating a correction value in the case of the presence of the direction shift, whereby correcting the transmission gain.

BRIEF DESCRIPTION OF DRAWINGS

FIG. 6 is a flowchart showing transmission power control of a radio communication terminal apparatus according to a third first embodiment.

BEST MODE FOR CARRYING OUT THE INVENTION

The following will specifically explain embodiments of the present invention with reference to the drawings attached herewith.

Figure 1:
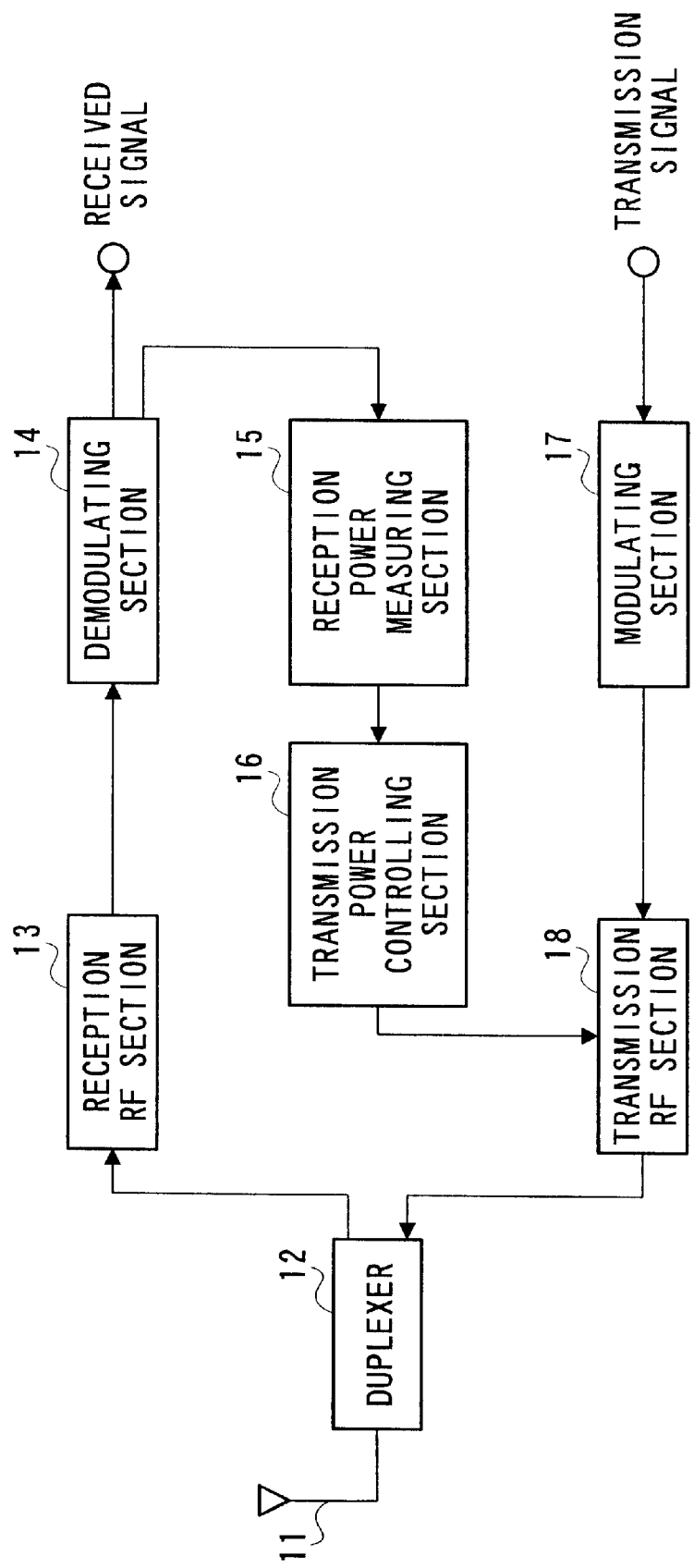
FIG. 1 is a block diagram showing a configuration of a conventional radio communication terminal apparatus.
Figure 2:
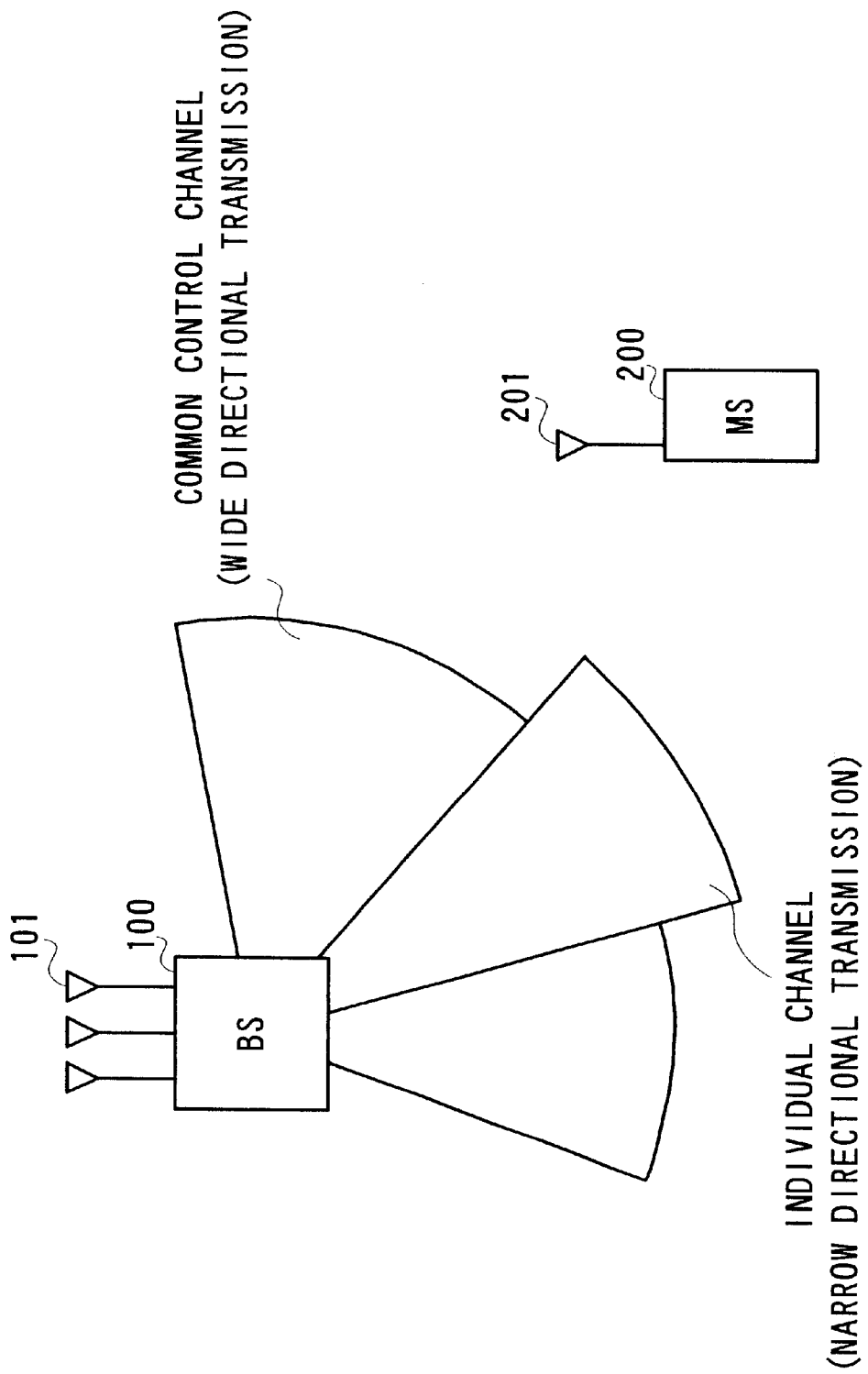
FIG. 2 is a system configuration view including a radio communication terminal apparatus of the present invention.

FIG. 2 is a system configuration view including a radio communication terminal apparatus of the present invention (hereinafter simply referred to as "terminal apparatus"). A base station apparatus 100 transmits a common channel signal with a wide transmission directivity from an antenna 101 and an individual channel signal to each terminal apparatus with a narrow directivity simultaneously. In accordance with the system, a perch channel, a broadcast channel, and the like are used as a common channel.

A terminal apparatus 200 receives the common channel with a wide transmission directivity and the individual channel signal with a narrow directivity from an antenna 201.

The following embodiments will explain the case in which communications are performed using a CDMA system. The CDMA system assigns spreading codes, which are orthogonal to each other, to the respective terminal apparatuses, and despreads transmitting data using the spreading codes and transmit it. The use of the codes orthogonal to each other between the plurality of terminal apparatuses makes it possible to perform communications with the plurality of terminal apparatuses with the same frequency and at the same time.

(First Embodiment)

Figure 3:
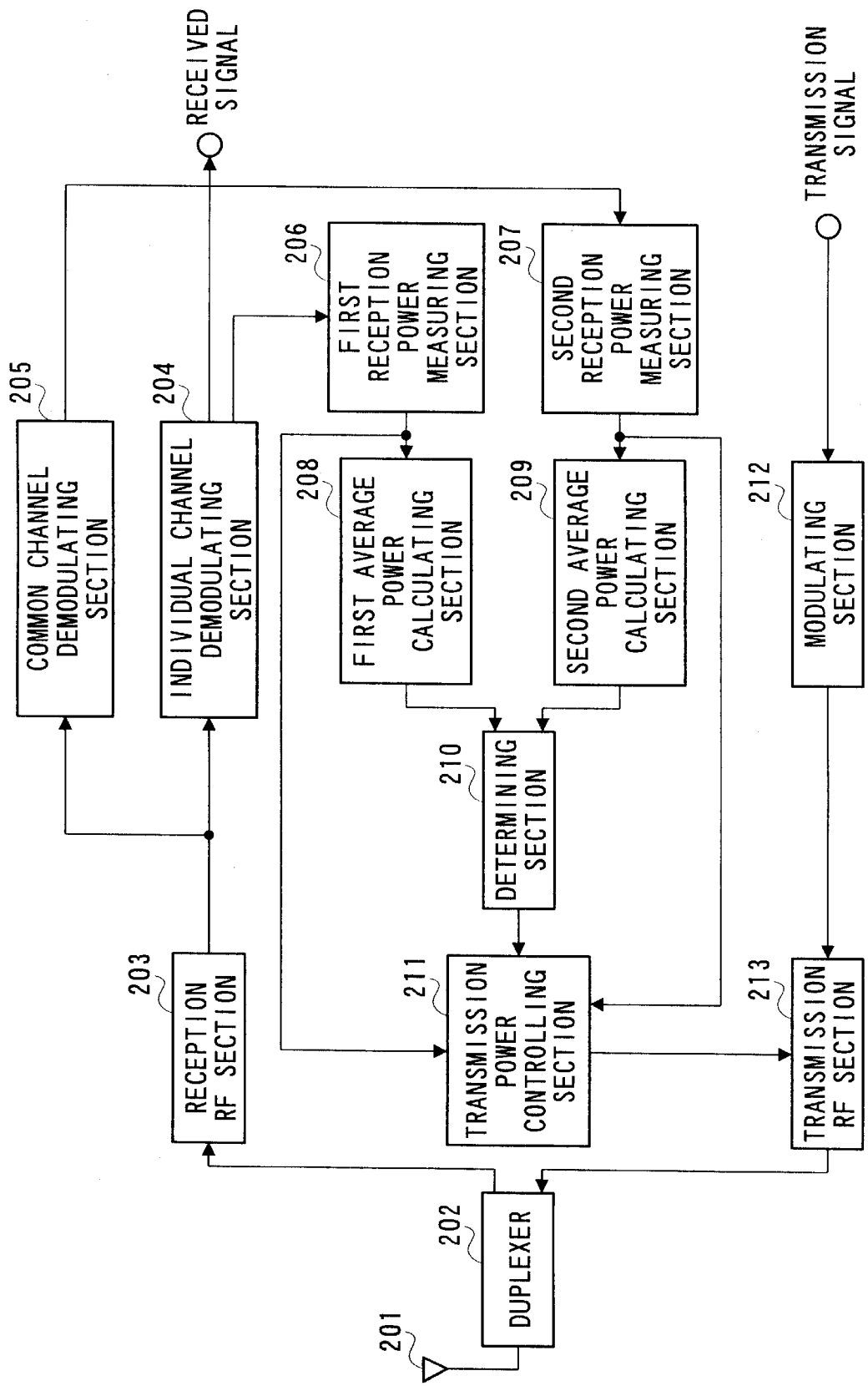
FIG. 3 is a block diagram showing a configuration of a radio communication terminal apparatus according to a first embodiment.

FIG. 3 is a block diagram showing a configuration of a radio communication terminal apparatus according to the first embodiment.

A duplexer 202 changes a path through which the signal is passed at a transmitting time and a receiving time, outputs a signal from the antenna 201 to a reception RF section 203, and outputs a transmission signal output from a transmission RF section 213 to the antenna 201.

The reception RF section 203 amplifies reception power, converts a frequency of the received signal, and outputs a baseband signal. An individual channel demodulating section 204 despreads the baseband signal by an individual channel spreading code, demodulates it, and picks up a signal of an individual channel of the terminal apparatus. A common channel demodulating section 205 despreads the baseband signal by use of a common channel despreading code.

A first reception power measuring section 206 measures reception power RMD(t1) of the despread individual channels. A second reception power measuring section 207 measures reception power RMC (t1) of the despread common channels. A first average power calculating section 208 calculates an average value ARMD(t1) of measured reception power RMD(t1) of the individual channels. A second average power calculating section 209 calculates an average value ARMC(t1) of measured reception power RMC(t1) of the common channels.

A determining section 210 determines whether or not the directivity of the individual channel is shifted with respected to the terminal apparatus based on whether or not a difference between the average reception power ARMD(t1) of the individual channels and the average reception power ARMC (t1) of the common channels is larger than a threshold value C. The threshold value C can be set as a system, or provided from the base station apparatus at an individual channel communication starting time.

If the difference between the average reception power ARMC(t1) of the common channels and the average reception power ARMD(t1) of the individual channels is smaller than the threshold value C, it can be detected that the directivity of the individual channel matches the terminal apparatus. While, if the difference between the average reception power ARMC(t1) of the common channels and the average reception power ARMD(t1) of the individual channels is larger than the threshold value C, it can be detected that the directivity of the individual channel is shifted with respect to the terminal apparatus.

The reason why the average reception power is used in determining the presence or absence of directivity is to suppress an instantaneous variation due to fading.

A transmission power controlling section 211 calculates a gain MG(t2) of a transmission amplifier on the basis of the determination result of the determining section 210 by use of the reception power of the individual channels and that of the common channels, and controls the amplifier at a transmission RF section 213.

Here, since the base station apparatus generally receives the signals with a plurality of directivities and combines the received signals, the signals can be correctly received even if the directivity at the forward link is shifted.

In case where the directivity of the individual channel matches the terminal apparatus and the directional gain is large, the reception power of individual channel becomes larger than a predictive arrival power. Accordingly, there occurs a problem in which reception power at the base station apparatus becomes small and the signal cannot be correctly received if transmission power control is performed based on the reception power of individual channel.

Therefore, if it is determined that the directivity of the individual channel matches the terminal apparatus, the transmission power controlling section 211 controls the gain MG(t2) of the transmission amplifier by equation (5) shown below based on the fixed gain G0 and the reception power RMD(t1) of the individual channel of the terminal apparatus. The fixed gain G0 is an added value of the gain GB(t1) of the transmission amplifier of the base station apparatus and the predictive reception power RB(t2) of the base station apparatus.

$$GM(t2)=G0-RMD(t1) \qquad (5)$$

While, in the case where the directivity of the individual channel is shifted and the directional gain is small, the reception power of the individual channel is smaller than the predictive arrival power. Accordingly, if transmission power control is performed based on the reception power of the individual channels, power arriving the base station apparatus will be increased by the amount of the reduction in the received signals caused by the directional shift.

Therefore, if it is determined that the directivity of the individual channel is shifted, the transmission power control section 211 sets the gain GM(t2) of the transmission amplifier of the terminal apparatus to be small by a constant G1 as shown by the following equation (6) as compared with the case in which the directivity of the individual channel matches the terminal apparatus.

$$GM(t2)=G0-RMD(t1)-G1 \qquad (6)$$

A modulating section 212 provides a primary modulation such as PSK, QAM and the like, to the transmission signal, and a secondary modulation thereto by use of spreading codes. A transmission RF section 213 converts the frequency of the modulated transmission signal, and amplifies transmission power based on the gain GM(t2) of the transmission amplifier.

The following will explain the flow of the signals at the terminal apparatus according to the first embodiment.

The signal received by the antenna 201 is input to the reception RF section 203 via the duplexer 202 and the reception RF section 203 amplifies power of the received signal, the frequency of the received signal is converted, and a baseband signal is picked up.

The individual channel demodulating section 204 despreads the baseband signal by use of the individual channel spreading code so as to be demodulated, and the individual channel signal of the terminal apparatus is picked up. Also, the common channel demodulating section 205 depreads the baseband signal by use of the common channel spreading code.

Then, transmission power control to be described later is made from reception power RMD(t1) of the individual channel and reception power RMC(t1) of the common channel by the first reception power measuring section 206, the reception power measuring section 207, first average power calculating section 208, second average power calculating section 209, determining section 210, and transmission power control section 211.

The transmission signal is modulated by the modulation section 212, the frequency thereof is converted by the transmission RF section 213, and the resultant is amplified based on the gain GM(t2) of the transmission amplifier and transmitted from the antenna 201 via the duplexer 202.

Figure 4:
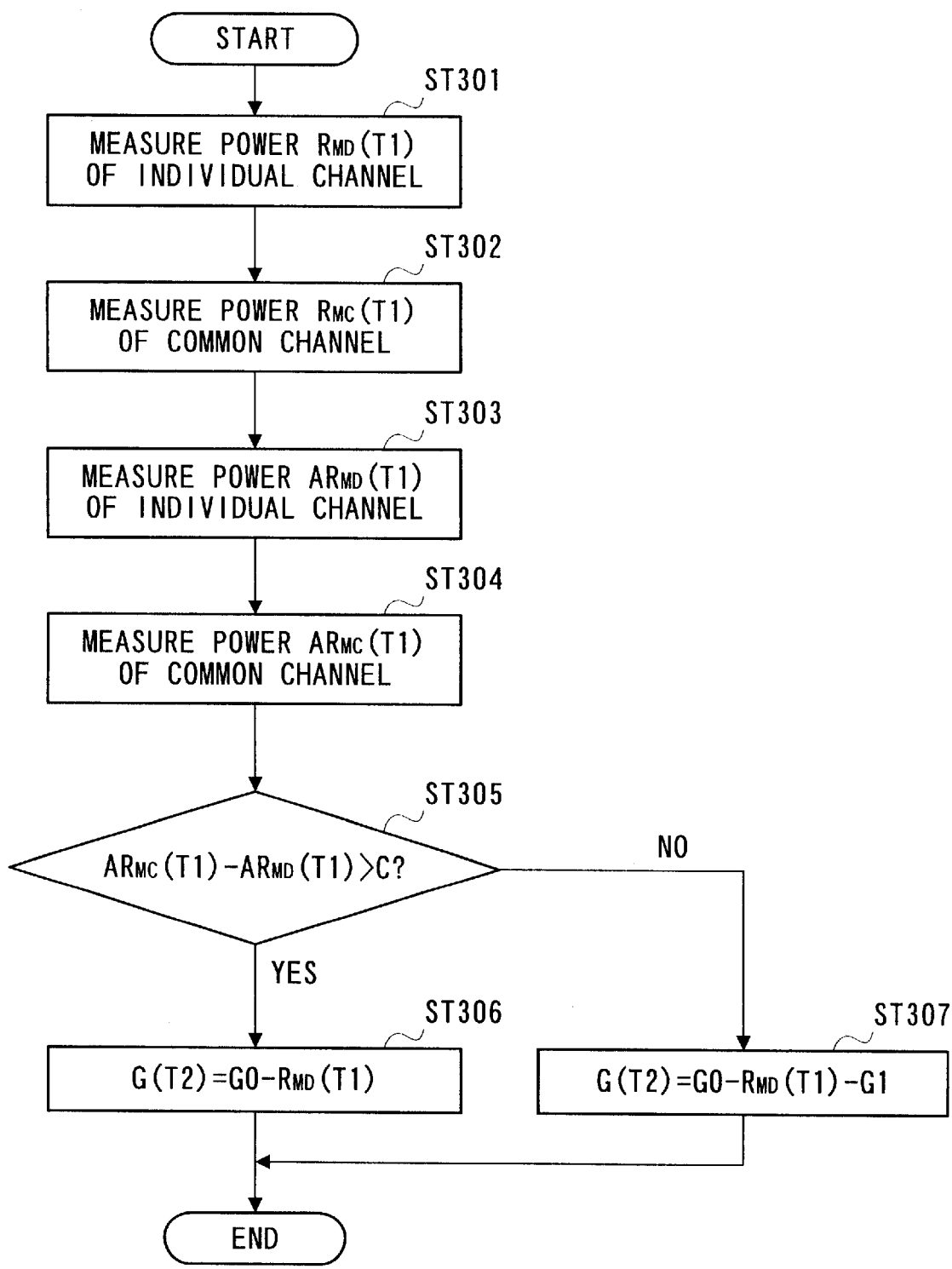
FIG. 4 is a flowchart showing transmission power control of the radio communication terminal apparatus according to the first embodiment.

Next, an explanation will be given of the transmission power control of the terminal according to the first embodiment with reference to the flowchart of FIG. 4.

First of all, the first reception power measuring section 206 measures reception power RMD(t1) of the individual channel of the terminal apparatus (ST301), and the second reception power measuring section 207 also measures reception power RMC(t1) of despread common channel (ST302).

Next, the first average power calculating section 208 calculates average reception power ARMD(t1) of the individual channels (ST303), and the second average power calculating section 209 calculates the average reception power ARMC(t1) of the common channel (ST304).

Next, the determining section 210 determines whether or not the directivity of the individual channel is shifted based on whether or not a value, which is obtained by subtracting the average reception power ARMD(td) of the individual channels from the average reception power ARMC(t1) of the common channels, is larger than the threshold value C (ST305).

Then, if it is determined that the directivity of the individual channel matches the terminal apparatus, the transmission power control section 211 calculates the gain GM(t2) of the transmission amplifier from equation (5) (ST306), and if it is determined that the directivity is shifted, the transmission power control section 211 calculates the gain GM(t2) of the transmission amplifier from equation (6) (ST307).

Thus, the presence or absence of the directional shift is determined from the average reception power of the common channels and the average reception power of the individual channels, and the transmission gain is corrected by the constant if the directivity of the individual channel is shifted, whereby making it possible to prevent transmission power from being increased excessively, to suppress interference with the other stations, and to extend the battery lifetime of the terminal apparatus.

(Second Embodiment)

The second embodiment shows a specific aspect in which the transmission gain is corrected based on the average reception power of the common channels and the average reception power of the individual channels in the case where the directivity of the individual channel is shifted.

The configuration of the terminal apparatus in the second embodiment is the same as that of the terminal apparatus shown in FIG. 2 and the explanation is omitted.

If it is determined that the directivity of the individual channel is shifted, the transmission power control section 211 sets the gain GM(t2) of the transmission amplifier of the terminal apparatus to be small by a value, which is obtained by subtracting the difference between the average reception power ARMC(t1) of the common channels and the average reception power ARMD(t1) of the individual channels from the threshold value C as shown by the following equation (7) as compared with the case in which the directivity of the individual channel matches the terminal apparatus.

$$GM(t2)=G0-RMD(t1)-(C-(ARMC(t1)-ARMD(t1))) \qquad (7)$$

Figure 5:
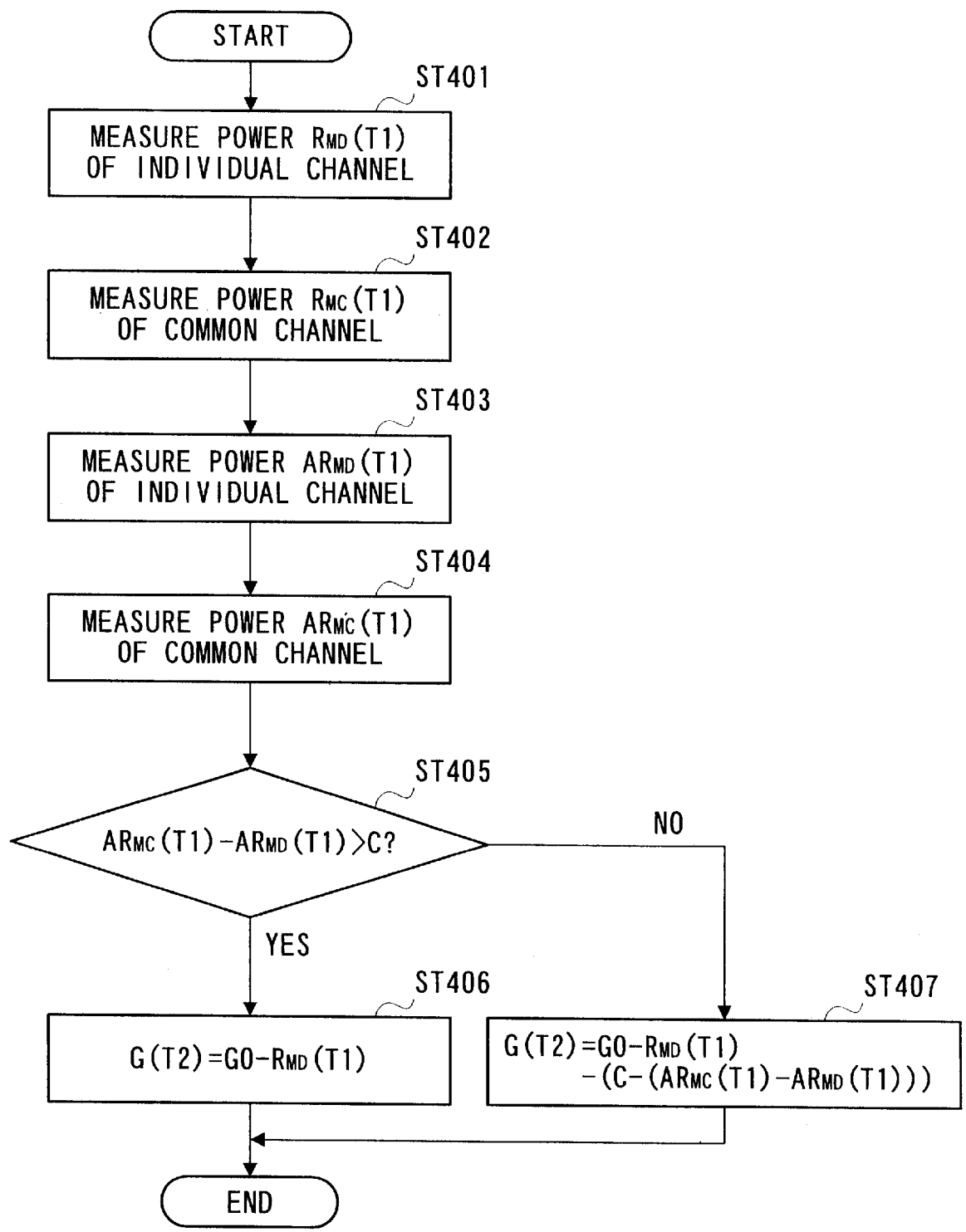
FIG. 5 is a flowchart showing transmission power control of a radio communication terminal apparatus according to a second embodiment.

The following will explain the flow of the transmission power control of the terminal apparatus according to the second embodiment with reference to the flowchart shown in FIG. 5.

First of all, the first reception power measuring section 206 measures reception power of the despread individual channel of the terminal apparatus (ST401), and the second reception power measuring section 207 also measures reception power of despread common channel (ST402).

Next, the first average power calculating section 208 calculates the average reception power of the individual channels (ST403), and the second average power calculating section 209 calculates average reception power of the common channels (ST404)

Next, the determining section 210 determines whether or not the directivity of the individual channel is shifted based on whether or not a value, which is obtained by subtracting the average reception power of the individual channels from the average reception power of the common channels, is larger than the threshold value (ST405).

Then, if it is determined that the directivity of the individual channel matches the terminal apparatus, the transmission power control section 211 calculates the gain GM(t2) of the transmission amplifier from equation (5) (ST406), and if it is determined that the directivity is shifted, the transmission power control section 211 calculates the gain GM(t2) of the transmission amplifier from equation (8) (ST407).

Thus, the transmission gain is corrected based on the difference in the average reception power between the common channel and the individual channel due to the directional shift, whereby making it possible to increase accuracy in transmission power control as compared with the case the correction is performed by use of the constant.

(Third Embodiment)

Referring to FIG. 6, the third embodiment shows a specific aspect in which the transmission gain is calculated based on the reception power of the common channel in the case where the directivity of the individual channel is shifted.

The configuration of the terminal apparatus according to the third embodiment is the same as that of the terminal apparatus shown in FIG. 2 and the explanation is omitted.

If it is determined that the directivity of the individual channel is shifted, the transmission power controlling section 211 controls the gain MG(t2) of the transmission amplifier by equation (8) shown below based on the fixed gain G0 and the measured reception power RMC(t1) of the individual channel.

$$GM(t2)=G0-RMC(t1) \qquad (8)$$

First of all, the first reception power measuring section 206 measures reception power of the despread individual channel of the terminal apparatus (ST501), and the second reception power measuring section 207 also measures reception power of despread common channel (ST502).

Next, the first average power calculating section 208 calculates the average reception power of the individual channels (ST503), and the second average power calculating section 209 calculates the average reception power of the common channels (ST504).

Next, the determining section 210 determines whether or not the directivity of the individual channel is shifted based on whether or not a value, which is obtained by subtracting the average reception power of the individual channels from the average reception power of the common channels, is larger than the threshold value (ST505).

Then, if it is determined that the directivity of the individual channel matches the terminal apparatus, the transmission power control section 211 calculates the gain GM(t2) of the transmission amplifier from equation (5) (ST506), and if it is determined that the directivity is shifted, the transmission power control section 211 calculates the gain GM(t2) of the transmission amplifier from equation (8) (ST507).

Thus, in the case where the directivity of the individual channel is shifted, the transmission gain is calculated based on the reception power of the common channel, whereby allowing the terminal apparatus to execute transmission power control even if the directivity is largely shifted and the signal with a variable directivity cannot be received.

Moreover, the above embodiments explained the case of communications using DCMA. However, the present invention is not limited to these embodiments and the same effect as the above embodiments can be obtained even if the other multiple access system is used.

As explained above, according to the terminal apparatus of the present invention and the transmission power control method, in a case where the base station apparatus transmits the signal with a narrow directivity, it is possible to correctly determine the cause of the reduction in reception power and to control transmission power accurately.

This application is based on the Japanese Patent Application No. HEI 10-243744 filed on Aug. 28, 1998, entire content of which is expressly incorporated by reference herein.

What is claimed is:

1. A radio communication terminal apparatus comprising:
  a first power measurer that measures reception power of a common channel signal transmitted from a base station with a wide directivity;
  a second power measurer that measures reception power of an individual channel signal transmitted from a base station with a narrow directivity;
  a determiner that determines the presence or absence of a directional shift based on the determination result of said first power measurer and said second power measurer;
  a transmitter that transmits a transmission signal to the base station; and
  a transmission power controller that controls transmission power based on the determination result of said determiner.

2. The radio communication terminal apparatus according to claim 1, wherein said determiner determines that the directional shift is present by determining that a value, which is obtained by subtracting an average reception power of the individual channel signals from an average reception power of the common channel signals, exceeds a threshold value.

3. The radio communication terminal apparatus according to claim 1, wherein said transmission power controller sets a value, which is obtained by subtracting the reception power of the individual channel signals from an initial setting gain, as a transmission gain when said directional shift is absent.

4. The radio communication terminal apparatus according to claim 1, wherein said transmission power controller sets a value, which is obtained by subtracting the reception power of the individual channel signals from an initial setting gain and further subtracting a correction value therefrom, as a transmission gain when said directional shift is present.

5. The radio communication terminal apparatus according to claim 4, wherein said transmission power controller sets a value, which is obtained by adding the average reception power of the individual channel signals to the threshold value and subtracting the average reception power value of the common channel signals therefrom, as said correction value.

6. The radio communication terminal apparatus according to claim 1, wherein said transmission power controller sets a value, which is obtained by subtracting the reception power of the common channel signals from an initial setting gain, as a transmission gain when said directional shift is present.

7. The radio communication terminal apparatus according to claim 1, further comprising a multiplexer that multiplexes information of the directional shift into a transmission signal.

8. A transmission power controlling method of a radio communication terminal apparatus, said method comprising:
  (a) determining the presence or absence of a directional shift from said terminal apparatus based on reception power of a common channel signal transmitted from a base station with a wide directivity and reception power of an individual channel signal transmitted from the base station with a narrow directivity; and
  (b) performing transmission power control based on the determination result of step (a).

9. The transmission power controlling method of a radio terminal apparatus according to claim 8, wherein step (a) determines a presence of said directional shift from said terminal apparatus by determining that a value, which is obtained by subtracting an average reception power of the individual channel signals from an average reception power of the common channel signals, exceeds a threshold value.

10. The transmission power controlling method of a radio communication terminal apparatus according to claim 8, wherein a value, which is obtained by subtracting the reception power of the individual channel signals from an initial setting gain, is set as a transmission gain when said directional shift from said terminal apparatus is not present.

11. The transmission power controlling method of a radio communication terminal apparatus according to claim 8, wherein a value, which is obtained by subtracting the reception power of the individual channel signals from an initial setting gain and further subtracting a correction value therefrom, is set as a transmission gain when said directional shift from said terminal apparatus is present.

12. The transmission power controlling method of a radio communication terminal apparatus according to claim 11, wherein a value, which is obtained by adding the average reception power of the individual channel signals to the threshold value and subtracting the average reception power value of the common channel signals therefrom, is set as a correction value.

13. The transmission power controlling method of a radio communication terminal apparatus according to claim 8, wherein a value, which is obtained by subtracting the reception power of the common channel signals from an initial setting gain, is set as a transmission gain when said directional shift from said terminal apparatus is present.

14. A radio communication terminal apparatus, comprising:

a first power measurer that measures reception power of a common channel signal transmitted with a wide directivity;

a second power measurer that measures reception power of an individual channel signal transmitted with a narrow directivity;

a determiner that determines the presence or absence of a directional shift from said terminal apparatus based on the determination result of said first power measurer and said second power measurer;

a transmission power controller that controls transmission power based on the determination result of said determining means, wherein the transmission power controller controls the transmission power in accordance with one of the following two relationships (i) $GM(t2)=G0-RMD(t1)-G1$ and (ii) $GM(t2)=G0 -RMC(t1)$, when the determiner determines the presence of the directional shift, and the transmission power controller controls the transmission power in accordance with the relationship $GM(t2)=G0-RMD(t1)$, when the determiner determines the absence of the directional shift, whereby $GM(t2)$ is a gain associated with the transmission power at time t2, $G0$ is an initial gain, $RMD(t1)$ is the measured reception power of the individual channel signal at time t1, $RMC(t1)$ is the measured reception power of the common channel signal at time t1, and $G1$ is a gain modifier.

15. A radio communication terminal apparatus, comprising:

a first power measurer that measures reception power of a common channel signal transmitted with a wide directivity;

a second power measurer that measures reception power of an individual channel signal transmitted with a narrow directivity;

a determiner that determines the presence or absence of a directional shift from said terminal apparatus based on the determination result of said first power measurer and said second power measurer;

a transmission power controller that controls transmission power based on the determination result of said determiner, wherein the transmission power controller controls the transmission power in accordance with one of the following two relationships (i) $GM(t2)=G0-RMD(t1)-G1$ and (ii) $GM(t2)=G0-RMC(t1)$, when the determiner determines the presence of the directional shift, and the transmission power controller controls the transmission power in accordance with the relationship $GM(t2)=G0-RMD(t1)$, when the determiner determines the absence of the directional shift, whereby $GM(t2)$ is a gain associated with the transmission power at time t2, $G0$ is an initial gain, $RMD(t1)$ is the measured reception power of the individual channel signal at time t1, $RMC(t1)$ is the measured reception power of the common channel signal at time t1, and $G1$ is determined in accordance with the relationship $G1=C-(ARMC(t1)-ARMD(t1))$, where C is a threshold value, $ARMC(t1)$ is an average reception power of all common channel signals transmitted with a wide directivity and measured by the first power measurer at time t1, and $ARMD(t1)$ is an average reception power of all individual channel signals transmitted with a narrow directivity and measured by the second power measurer at time t1.

* * * * *